United States Patent [19]
Bracegirdle

[11] Patent Number: 5,988,864
[45] Date of Patent: Nov. 23, 1999

[54] PROCESS FOR PRODUCING AGGREGATE FROM WASTE

[76] Inventor: Paul E. Bracegirdle, 9 Crimson Leaf Dr., Newtown, Pa. 18940

[21] Appl. No.: 08/960,160

[22] Filed: Oct. 29, 1997

[51] Int. Cl.⁶ .................................. B05D 3/02; B28C 5/46
[52] U.S. Cl. ..................................... 366/7; 366/8
[58] Field of Search .................... 366/2, 3, 4, 6, 366/7, 8, 10, 12, 23, 24, 25; 106/718, 714, 602, 603, 607; 110/165 R, 165 A; 34/499, 497

[56] References Cited

U.S. PATENT DOCUMENTS

| | | | |
|---|---|---|---|
| Re. 32,206 | 7/1986 | Bracegirdle | 366/8 |
| 4,245,915 | 1/1981 | Bracegirdle | 366/12 |
| 4,781,944 | 11/1988 | Jones | 427/228 |
| 5,040,920 | 8/1991 | Forrester | 405/129 |
| 5,057,009 | 10/1991 | Nechvatal et al. | 110/165 A |
| 5,302,179 | 4/1994 | Wagner | 71/13 |

Primary Examiner—Tony G. Soohoo
Attorney, Agent, or Firm—Daniel Kramer

[57] ABSTRACT

The described process utilizes the ash from a trash-to-steam plant and a cementitous binder along with the hot output of an earth purification process and a strictly defined quantity of water in calculated amounts to produce an aggregate which satisfies leach and strength tests and qualifies for use in road building and as a landfill cover.

12 Claims, 2 Drawing Sheets

PROCESS FOR PRODUCING AGGREGATE FROM WASTE

FIELD OF THE INVENTION

My invention is directed to the field of the utilization of waste materials to produce useful product.

The invention is further directed to the field where the ash arising from trash to steam plants is converted to useful purposes.

The invention is further directed to field pertaining to a process for employing such ash as an ingredient in the production of stone substitutes and especially stone substitutes or aggregate employed in construction and in landfill cover.

The invention is further directed to the field pertaining to the process by which such ash is converted to said aggregate and to the specific ingredients required.

The invention is further directed to the process by which certain properties of the stone-like product are monitored and controlled to provide a product which meets desired requirements.

The invention is further directed to the field pertaining to the process by which potentially toxic residues in the ash are permanently trapped within the stone-like product.

The invention is further directed to such a process where heat required for effectuation of such process is derived from waste sources.

The invention is further directed to such a process where heat is directly derived from a useful constituent of the product.

The invention is further directed to such a process where such a hot constituent is a product of an earth burning or pyrolysis and purification process.

The invention is further directed to such a process in which the water content of the ingredients and the mixed temperature of the ingredients is controlled within a narrow range and iteratively calculated.

The invention is further directed to such a process where the mixed temperature of the mixture is controlled in part by adjustment of the quantities of the individual ingredients, each ingredient having a measured temperature.

The invention is further directed to such a process which can be carried out in either a batch mode or a continuous mode.

BACKGROUND

Enormous quantities of garbage are generated by modern societies. For example, United States residents produce on the average 400,000 tons of solid waste per day. This is about 3.5 pounds per day per resident. Two disposal techniques are predominant.

In the first technique, called landfill, the trash is conveyed to a place where it can accumulate, the landfill. Since trash may include many organic materials, including kitchen and other wastes, and wastes which attract birds and rodents, and also wastes from hospitals and homes in which disease contaminated materials reside, there are published regulations governing how the garbage is to be protected. Generally such regulations require the external surface of the mound of trash to be protected by a layer of earth and that each layer of trash within mound be covered at the end of each working day by a layer of impermeable material such as soils and aggregate, to limit the access of so called vectors, rodents and birds which could contribute to dissemination of such diseases. Further, the space available for landfills is sharply limited by various environmental factors. Political entities are struggling to reduce the quantity of waste produced within their jurisdictions not only to extend the life of their landfills but because the costs of employing landfills can be significant. It is not unusual to find landfill owners charging $100.00 per ton, so called "tipping" fees, for their use. One reduction technique is to require separation of and recycling of specific kinds of waste. For instance, organic and garden or lawn waste can be composted. Glass, plastic and paper wastes can be recycled.

In the second technique, called trash to steam, the trash is burned in a steam generating boiler plant. The steam is employed to generate electricity or for other purposes. The volume of waste is reduced by 80 to 90 percent, thereby increasing the capacity and life of existing landfills by a factor of 5 to 10. Further, burning waste eliminates any risk of hazardous diseases surviving the high temperatures inherent in the burning process. For example, steam generating plant having an electrical output of 50 megawatt (MW), burning 100 percent prepared trash having a heat content of 4500 Btu/pound requires about 4500 tons (T) of fuel trash per week. However, enormous quantities of hot ash are produced by such plants. The above 50 MW generating plant would produce about 675 T per week of ash. About 75 percent of the total amount of ash produced resides in the discharge grate and is known as bottom ash. The remainder is entrained in the stack gasses and is called fly ash. Fly ash is found and removed from the boiler heat transfer surfaces and from bag type filters or electrostatic precipitators through which exhaust gasses from the burning process are passed. Unfortunately, both the bottom ash and fly ash from both sources frequently contain concentrations of toxic metals such as zinc, lead and cadmium and of acid forming materials such as sulphate. Further, fly ash may have many times greater concentration of toxic organic elements and toxic metals and metallic compounds than bottom ash. This is both because fly ash leaves the fire zone before it can be fully affected by the hottest furnace temperatures and because the fly ash is exposed to and becomes contaminated with the vapors of the metals, metal compounds and organic toxins which have been decomposed and distilled out of the burning trash. Most trash burners combine the bottom and the fly ash and soak the combined ash with water to reduce its temperature. Others keep the fly ash separate and treat both independently. Since the cooling water itself becomes contaminated by contact with the ash, an effective process must fully utilize the water retained by the cooled ash.

Disposal of the ash in such a way that the toxic material cannot leach into the water supply has been a serious problem. In many cases the trash burning plants must pay contractors to remove the ash and to safely dispose of it. The EPA and other agencies have generated regulations governing disposal of this ash.

In other environments, great tonnages of earth, which have been contaminated by leakages of fuel and other oils and chemicals, must be treated in such a way as to make the leachate from such earth non-contaminating to water supplies. The usual process employed to decontaminate such contaminated earth is burning or pyrolysis. In the burning process the contaminated earth is heated to a high temperature. The toxic vapors emanating from the contaminated earth are recovered and safely disposed of. The earth, now devoid of all organic material and therefore useless for any farming purpose must be safely disposed of. The earth disposal process requires first cooling the heated earth and then depositing it in an environmentally non-damaging site.

The process of the invention produces an aggregate product in which the particles of ash are micro-encapsulated so that toxic and leachable elements are confined. The product, formed according to the process, has the required physical properties, such as compressive strength and abrasion resistance, to be employed as aggregate in either road base, hot mix asphalt or lime and cement based concrete or as cover in landfills. Further, by employing the normally wasted heat contained in an uncooled input stream of one of the constituents, the heating process in many cases can be conducted without the cost of carbon based fuel or the cost of mechanism required to burn it or the environment degrading products of fuel combustion such as carbon dioxide, sulphur dioxide, etc., though that method may be employed.

In order to produce an aggregate which meets the requirements of compressive strength, hydraulic conductivity, freeze thaw weathering and contaminant leachability mandated by standards, unique and strictly controlled conditions must be met and strictly maintained. Further, by strict control of the temperature and the initial moisture levels in the pre-baked/tumbled aggregate and the physical properties of the final product, the product qualitites are enhanced to the point where they can be freely employed in road construction despite the expansive effect of high sulphate content in the fly ash.

SUMMARY OF THE INVENTION

A process employing a heated or unheated tumbler for producing a rock-like product useful in the production of hot mix asphalt or Portland type concrete or as a landfill cover. The process employs ingredients comprising: ash byproduct from a trash to steam plant (trash ash), cementitous material (cement), hot pyrolytically refined earth (hot earth) having a temperature in excess of 212 F. and water.

One preferred version of the process comprises the following steps:
- a.) establishing a desired temperature and a desired gross water content of the input mix to the tumbler;
- b.) selecting and inputting an initial quantity of wet trash ash;
- c.) determining the water content and temperature of the trash ash;
- d.) determining the temperatures of each of the hot earth, water and cement;
- e.) calculating the masses of hot earth, cement and water employing as input parameters the quantity of wet ash, its temperature, specific heat and moisture content, the temperature of the hot earth and its specific heat, the quantity and temperature of the water and its specific heat, and the amount of cement, its temperature and specific heat;
- f.) inputting the estimated quantities of hot earth, cement and water;
- g.) tumbling the mixture, and in the absence of hot eart, applying heat;
- h.) examining the tumbled mixture and increasing or reducing the quantity of water in a subsequent batch based on the condition of the tumbled product.

While, for simplicity, the above process describes a batch process, it is intended that the same process steps apply as well to a continuous process.

DETAILED DESCRIPTION OF THE DRAWINGS

Figure 1:
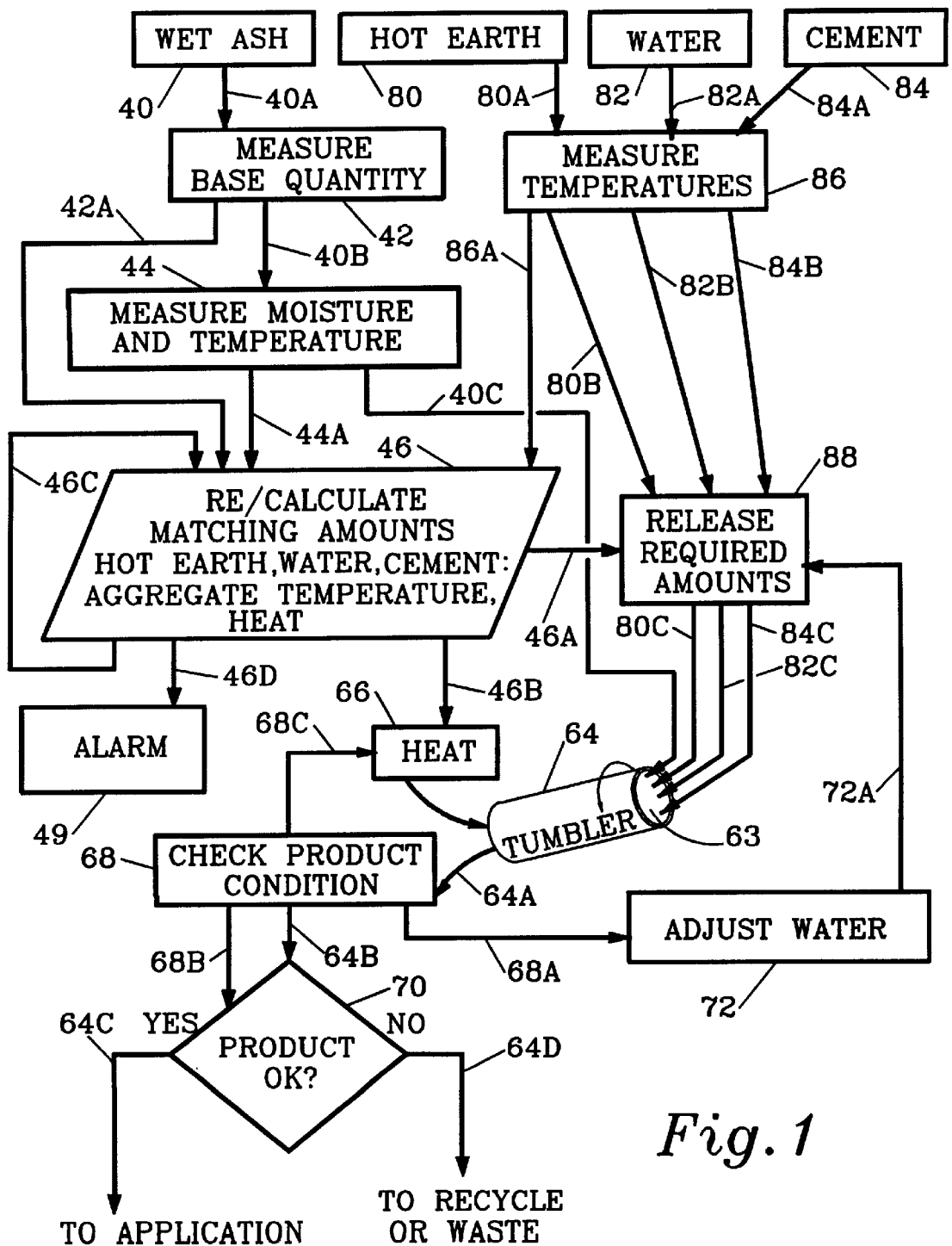
FIG. 1 displays the process steps for a batch process described above.
Figure 2:
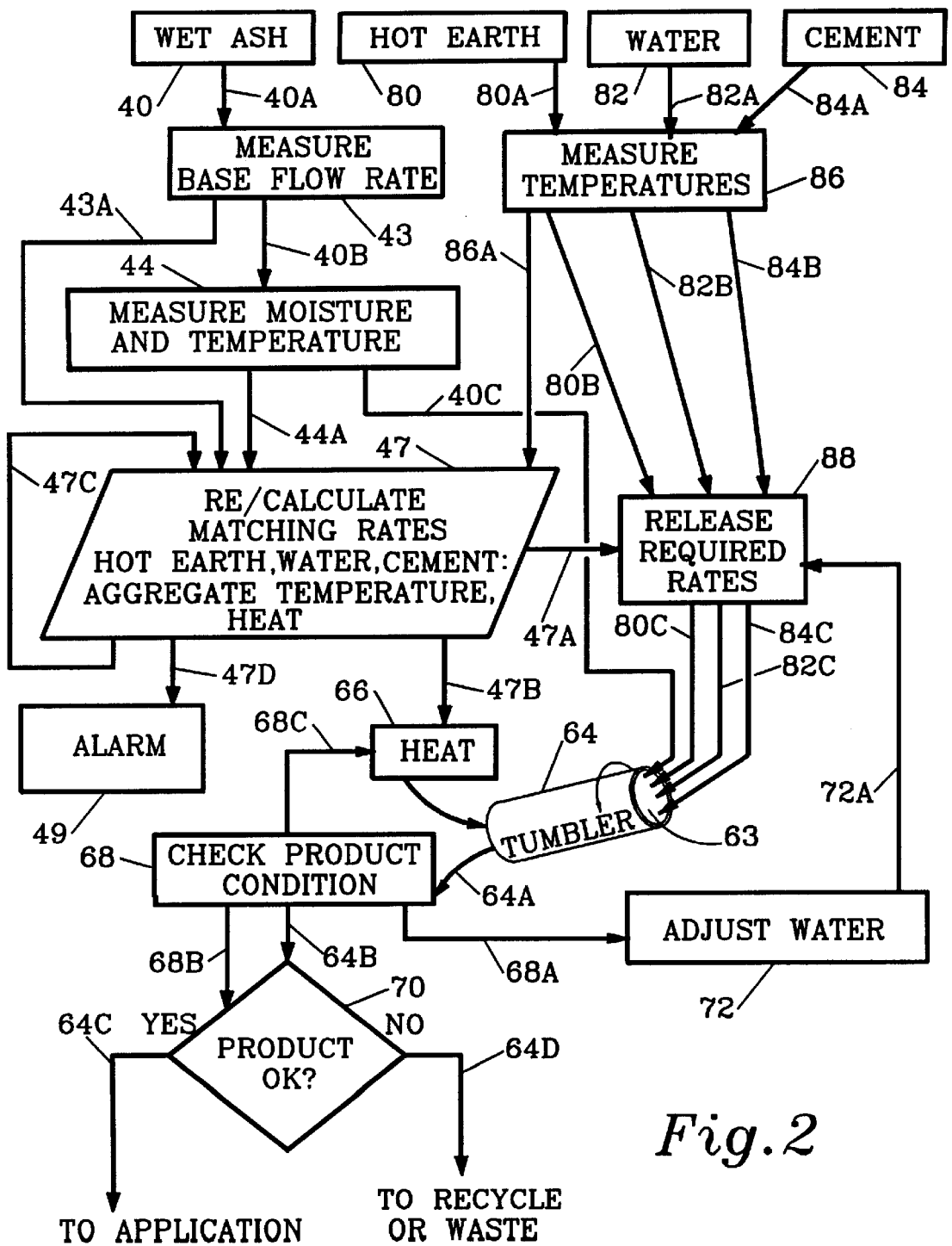
FIG. 2 displays similar steps for a continuous, as distinct from a batch process.

There are two figures. FIG. 1 illustrates a batch mode process utilizing the principles of the invention. FIG. 2 sets forth similar steps which would be employed in one form of a continuous process to achieve the same objective.

In the description of the several processes of the invention, the term cement is employed. In each case, the term is intended to be generic and is not intended to specify or exclude any particular composition or mixture of pozzolanic or cementitous materials.

In both figures there are established paths for ingredient flow and paths for information flow. Paths for flow of any individual ingredient always bear the basic number for the ingredient, followed by a letter. Paths for information flow bear the identification number of the information generator, followed by a capital letter. For example, wet ash has the identification number 40. The path followed by the ash to the quantity measurement step is represented by line 40A. From the quantity measurement step 42 the ash itself flows by path 40B to the moisture and temperature measurement step 44. However, the quantity information generated in step 42 flows by path 42A to the calculation step 46 and the moisture and temperature information generated in step 44 flow to calculation step by path 44A. To continue the example, having followed the path of the wet ash from source 40 through the quantity measurement step 42 and the moisture and temperature measurement step 44, the wet ash ingredient 40 then flows from temperature/moisture measurement step 44 to the tumbler 64 via ash ingredient path 40C, the numeral 40 again representing the ash constituent. Note that the temperature and moisture information flow from the temperature and moisture measurement step 44 to the calculation step via information path 44A.

Though discrete lines are shown to illustrate the transfer paths of information, the actual paths employed in a real time process may not be direct and need not be through wires. The information may be transferred in any convenient way to the process step requiring the information. The fact that, in any figure, information paths may be shown direct from the source to the process step requiring the information, must not be interpreted or permitted to suggest that, for convenience or speed, the information might not be transferred by a printed message, by a floppy disc or by a code or might not be combined with other information related or unrelated to the process.

Referring again to FIG. 1, item 40 is the base constituent of the final product 64A and represents the wet ash output from a trash to energy burner. This ash may be an agglomerate of bottom and fly ash or it may consist of bottom ash only. The ash from such a burner, typically a municipal solid waste burning facility, is emitted as a red hot or even white hot slag. It is cooled by spraying with water until cold. The water content of the cooled ash is typically in the range of 20–25 percent of its dry weight. Bottom ash combined with fly ash is likely to retain a greater percentage of water than bottom ash alone.

In FIG. 1 the quantity of the wet input ash ingredient 40 is measured at step 42. The preferred measurement process secures the weight of the ingredients, though other measurement processes such as volume could be acceptable. The weight information is conveyed to the calculation step via information path 42A.

The moisture content of the mix and its temperature are secured at step 44 and conveyed to the calculation step via path 44A. Although the measurement of temperature and moisture content in a given sample can be quite precise, the inference that the measured temperature and moisture content is a perfect representation of the average value for these variables within a given batch or load is poor. In fact the ash temperature may be subject to numerous variables such as "hot spots" within the railway carload of material and the possibility that, in cold climates, a portion of the wet ash may have frozen. Further, the moisture content of the test sample may be far different from the average moisture content of the batch either because of stratification, drainage, evaporation or freezing.

It is important to note the possibility of these temperature and moisture variations since it is these potential variations which, in part, generate uncertainty in the water content and temperature of the ingredient input 63 to tumbler 64 and its product output 64A and therefore establish the need for periodic or continuous checking of the condition of the product in or leaving tumbler 64.

Further, it is important to note that the temperature measurement steps 86 and 44 do not demand that temperature sensors actually be in contact with the ingredients. For the purpose of the invention, the temperature of the ingredients can be inferred from the temperature of the ambient surroundings within which the ingredients are stored. Such temperatures need not be measured directly by the user of the process but can be secured from local or remote observations by others, including, but not restricted to temperatures reported by local or national weather bureaus.

The potential for temperature variation in the tumbling mixture input 63 and output 64A as a function of the variation of the fraction of water in the input ash arises because the amount of heat required to raise a pound of water one degree F is about five times the quantity required to raise a pound of dry ash the same one degree F.

For example, if the measured water concentration or water fraction in the input ash is significantly greater than the average amount of water in the wet input ash, then the amount of heat calculated and provided to raise the entire entering mass 63 to the tumbler 64 to the required temperature will be insufficient and the entering mass 63 will be cooler than predicted, thereby affecting the output quality of the product at 64A.

This effect would be exaggerated if some of the water in the entering ash is frozen since the amount of heat required to thaw a pound of water is about 144 times the amount of heat required to raise the temperature of liquid water only one degree F.

The moisture determination is most conveniently carried out by securing a representative sample of the wet ash mixture, weighing the wet ash sample, then roasting the sample to dryness and reweighing. The original fraction water in the ash is the ratio of the weight lost in the drying process to the weight of the dried ash sample. Therefore, the weight of the water component in the wet mixture is simply the product of the gross weight of the wet mixture and the fraction water in the sample. The weight or mass of mixed dry ash component of the original wet ash mixture is the wet mass minus the fraction of the mixture that is water. Another, potentially more reliable method of measuring the average water content of the wet ash would be to measure both the volume and the weight of a given quantity of wet ash. Since the specific gravity of the dry ash is easily obtained experimentally (typically about 3) and, since its volume is not changed appreciably by the addition of water and the well known specific gravity of water is 1.0, the moisture content of an ash sample is easily calculated.

For example, a 10 cu.ft. volume of wet ash has a measured weight of 2350 lb. A 10 cu.ft. volume of dry ash having a density of 3 has a weight of $10 \times 62.5 \times 3 = 1875$ lb. Therefore the net weight of water in the wet ash is $2350 - 1875 = 475$ lb. The fraction water in the ash on a wet basis is $475/2350 = 0.20$ or 20 percent and on a dry basis is $475/1875 = 0.25$ or 25 percent.

Returning to FIG. 1, the hot earth ingredient 80 flows by path 80A to temperature measuring station 86. Water ingredient 82 also flows via its flow path 82A to temperature measuring station 86. The cement ingredient 84 also flows via its flow path 84A to the temperature measuring station 86. The temperatures of the three ingredients, hot earth 80, water 82 and cement 84 are conveyed to the calculation module or process step 44 via information path 86A. It is important to note that, while temperature measuring step 86 is illustrated as a single element, there is no restriction on the relative locations of the temperature measuring sensors. Equivalent temperature measuring structures may be incorporated in individual modules or in any convenient arrangement. Exactly the same caveat applies to the temperature information path 86A, since this path may have individual structures for conveying the temperature of each ingredient to the calculation step 46 and the temperature information path 86A is shown as a single line for convenience only. Further, the measurement of the ash moisture and temperature and the measurement of the temperatures of the other ingredients may be conducted within the masses of the stored materials, ash 40, hot earth 80, water, 82 and cement 84 and, in the case of the ash, prior to the quantity measurement step.

At this point in the process, having the initial temperatures of all the ingredients, wet ash 40, hot earth 80, water 82 and cement 84, it is possible to estimate at process step 46 the ingredient mix which is to enter the drying/processing tumbler along with the initial measured quantity of wet ash. The ingredients are the ash, cement, additional water, if required to effectively react with the cement material and sufficient hot ingredient to raise the temperature of the mix to the desired entering mixture temperature. While the desirable mixture temperature within tumbler 64 may vary slightly, depending on the ratio of ash to earth, a design mid-point temperature is 175 F.±25 F.

Knowing the dry weight and temperature of the input ash and the quantity of water associated with that ash, as well as the temperatures of the earth, cement and water, it is possible to make an estimate of the amount of the hot earth required, at its known temperature, to raise the mix to the desired temperature. From the dry weight of the earth plus ash the measure of cement required to micro-encapsulate the ash/earth ingredients and seal it against leaching toxins and metals and form the material into a high proportion of relatively large aggregate material can be calculated. A typical cement fraction employed in the present process is 20 percent of the aggregate dry weight of the ash and the earth. The amount of water required to be added to the mix is calculated from the mass of cement and typically is 28 percent of the cement mass. The quantity of water in the ash, though potentially a participant in the process, is ignored in this calculation of extra water required. If the temperature of the incoming hot earth is not high enough attain an input temperature to the tumbler of 185 F., the calculation will establish an earth input at a 50 percent level and direct that heat from heat source 66 be applied to the tumbler interior to achieve the desired temperatures.

The calculation is performed by a routine 46 based on the above described information inputs and the desired objectives and limits established. Although typical limits have been described, equivalent limits which cause the product to meet the desired requirements can be employed. Further, through the primary variable in the calculation is shown as the quantity or rate of flow of the wet ash 40, the calculation may as well be structured so that the primary variable or primary ingredient is the quantity or flow rate of either the hot earth 80 or the cement 84 with the flow rates of the other non-primary ingredients being dependent on the quantity or flow rate of the ingredient selected as the primary variable.

Nomenclature:
Temperature of ash: Tas
Initial temperature of hot earth: Ter
Temperature of cement: Tce
Temperature of water in ash: Same as Tas
Temperature of water (ingredient 82): Tw82
Fraction water in ash (wet basis): Fwas
Weight of dry ash: Wasd=Wasw(1−Fwas)
Weight of wet ash: Wasw
Weight of earth: Wer≦Wasd
Weight of cement: Wce=0.2(Wasd+Wer)
Weight of water in ash: Wwas
Weight of Water (ingredient 82): Ww82=0.28 Wce Desired mix temperature=T (175 F. employed for this example)

Heat required to warm non-earth ingredients to mix temperature:
Wet ash: Qas
Water(82): Qw82
Cement: Qce Heat supplied by hot earth in cooling to mix temperature: Qer External heat required from element 66: Q66

Ingredient specific heat (Cp); The amount of heat in Btu/lb. required to raise a one lb. quantity 1 F. A Cp of 0.2 Btu/lb-F is assumed for all dry ingredients. A specific heat of 1.0 Btu/lb-F is assumed for water.

Quantity; Pounds (lb)

Heat Balance:
Heat required to warm ingredients to 175 F.:
Qas=0.2 Was(1−Fwas)+1.0 Was×Fwas(175−Tas) Btu
Qce=0.2 Wce(175−Tce) Btu
Qw82=1.0 Ww82(175−Tw82)

Heat supplied by hot earth in cooling from Ter to 175 F.
Qer=0.2 Wer(Ter−175) Btu Calculation Procedure:
Assume Wasd=Wer
Employ heat balance: Solve for Wer
If Wer<Wasd, then recalculate
  employing just calculated value of Wer
If Wer>Wasd, then set Wer to Wasd
  and calculate external (element 66) heat required.
If Wer>Wasd
External heat (element 66) required=Qas+Qce+Qw82−Qer Btu Process step 46 has several outputs: Output 46A transmits to control 88 the information for the individual flow control of each ingredient: hot earth 80, water 82 and cement 84. Output 42B transmits to heat input 66 information which determines whether or not supplementary heat input 66 functions to further heat the mix 63 within tumbler 64. Output 46C recycles information output by the calculation process 46 back to its input for recalculation where necessary. Output 46D causes alarm 49 to actuate if process control parameter limits are exceeded.

The calculation, having been performed at process step/s 46, the output information directing appropriate actions conforming the calculation results are transmitted to physical element 88 which controls the flow or delivery of ingredient amounts specified by process step 46. Though control element 88 is displayed in FIG. 1 as a single element, in practice the control elements for the individual ingredients may be separate devices such as volume measures, weight measures or control valves actuated for selected time periods.

The mixture, its proportions of ash, hot ingredient, cement and water having been calculated, now flows into the tumbler where the agglomeration of the ingredients into the desired aggregate sizes occurs. The speed of the tumbler is a functional variable, since a higher tumbler speed facilitates the production of a higher percentage of small aggregates while a lower tumbler speed, while promoting larger aggregate sizes, limits the process throughput.

The final product, comprising the input wet ash 40 mixed with the quantities of other ingredients, hot earth, water cement and, if necessary, heat, emerges from tumbler 64 via output stream 64A. The physical condition of the output stream 64A is monitored by visual and test methods to determine its suitability for the intended purposes. If the inspection process at 68 indicates that the product 64A has not reached the required temperature, an instruction to the heat source is provided via path 68C to provide more heat to the next batch. If the inspect reveals that the output product 64A is too wet or too dry, information is conveyed via path 68A to water control 72 which, in turn conveys the information to the controller 88 via information path 72A. The feedback of quality information resulting in adjustment of the input parameters of water and heat provide a substantial improvement over prior methods of producing such aggregates. Further, the use of hot earth to provide heat input to the process allows for the reduction or even elimination of an external heat source.

While, in the following description, wet ash is treated as the primary ingredient, any of the ingredients such as earth or cement could be employed in the calculation procedure of step 47 as the primary ingredient and the quantities of the other ingredients adjusted to match.

Referring now to FIG. 2, there is shown a continuous process for producing the concrete aggregate whose production in a batch process was described in detail in connection with FIG. 1.

In FIG. 2, wet ash 40 flows to flow rate measurement step 43. There the rate of wet ash flow is measured by a volume or a weight process. The flow rate within the continuous process may be generated either by a continuous feed device such as a screw or by a series of individual batches, as by a bucket type conveyor. Further, the flow rate measuring device may be the same device which withdraws the ash from the supply mass 40. The moisture and temperature measurement step 44 may be before the base flow measurement step 43 or simultaneous with it.

The flow rate information is conveyed to calculation step 47 via rate information path 43A and via temperature/moisture information path 44A. The temperatures of the hot earth 80, water 82 and cement 84 are observed either in the bulk or within the individual ingredient flow streams at temperature measurement step 86. The temperatures of the individual ingredients are conveyed to the calculation step 47 by information flow path 86A. While temperature information flow path 86A is shown as a single line it must be understood that three separate temperatures may be conveyed by temperature information path 86A to calculation step 47. It must be further understood that the temperatures of the ash 40, the water 82 and the cement 84 may be inferred from the temperatures of their storage environments and entered as constants into the calculation procedure 47.

Calculation step 47 calculates the flow rates of the hot earth 80, the cement 84 and the water 82 which provide the correct water and temperature conditions of the mixture 63 entering the tumbler 64. The required three flow rates are communicated to the independent flow controls 89 for each of the earth, cement and water via information path 47A so that flow streams 80A, 80B and 80C; 82A, 82B and 82C; and 84A, 84B and 84C are in accord with the calculation results generated by calculation step 47.

The individual flow streams 40C for the wet ash, 80C for the hot earth, 82C for the water and 84C for the cement comprise the mixture 63 entering the tumbler 64. Within the tumbler, at the reaction temperature at or about 175 F., the mixture becomes coated with the cement and forms into an aggregate of the desired composition, form and structure. The reacted product leaves tumbler 64 via product flow path 64A and its condition is checked at step 68. The condition of the product is conveyed by information path 68B to path control 70. If the condition of the product meets requirements it is routed via material flow paths 64B and 64C to the application. The application may be storage or immediate use. If the product condition is not satisfactory, the monitoring step 68 conveys information to the product path controller 70 to route the product flow 64B to waste or recycle via product flow path 64D; to the heat module 66 to supply or increase or decrease needed heat via information path 68C and/or to the water flow module 72 via information path 68A to increase or decrease the flow rate of water. Water flow module 72 thereupon directs water control valve or element 86 via information path 72A to increase or decrease the water flow rate. The heat module 66 then supplies, increases or decreases the amount of heat supplied to the interior of tumbler 64.

From the foregoing description, it can be seen that the present invention comprises an improved process for producing an aggregate from waste materials and other features. It will be appreciated by those skilled in the art that changes could be made to the embodiments described in the foregoing description without departing from the broad inventive concept thereof. It is understood, therefore, that this invention is not limited to the particular embodiment or embodiments disclosed, but is intended to cover all modifications which are within the scope and spirit of the invention as defined by the appended claims.

I claim:

1. A process for fixing and stabilizing toxic metal and organic contamination contained in ash within a concrete-like aggregate product, the process employing as primary ingredient and as sole external heat source, hot earth, said hot earth being the output of a pyrolytic earth purifier; and secondary ingredients comprising ash containing toxic materials, cement and water; the process comprising the steps of;
   a.) observing the temperatures of the primary and secondary ingredients,
   b.) determining the concentration of water in the ash,
   c.) measuring an amount of primary ingredient,
   d.) providing a calculation step and conveying the amount, the ingredient temperatures and the concentration of water to the calculation step,
   e.) establishing product condition limits and conveying these limits to the calculation step,
   f.) calculating, by way of an iterative heat balance, the quantities of the secondary ingredients required to be mixed with the measured amount of the primary ingredient, to establish product conditions after the mixing step that will be within the desired product condition limits,
   g.) conveying the calculated quantities of the secondary ingredients plus the measured amount of the primary ingredient to a mixer/tumbler,
   h.) mixing/tumbling all the ingredients thereby securing a product having a temperature and a moisture content.

2. A process as recited in claim 1 where the hot earth entering the process has a temperature greater than 212 F.

3. A process as recited in claim 2 further providing that the product condition limits after the mixing step are 175 F.+/−25 F. temperature and a water content equal to 28 percent of the mass of cement and that these limits are conveyed to the calculation step.

4. A process as recited in claim 3, further providing for observing the temperature and moisture content of the product, transmitting the observed product conditions to the calculation step, comparing the observed product conditions with the product condition limits and, if the observed product conditions are outside the product condition limits, calculating and adjusting the quantity of one or more secondary ingredients to bring the condition of successive products within said limits.

5. A process for fixing and stabilizing toxic metal and organic contamination contained in trash-burner ash within a concrete-like aggregate product, the process employing as primary ingredient and as sole external heat source, hot earth, said hot earth being the output of a pyrolytic earth purifier; and secondary ingredients comprising wet ash produced by a trash burner, said ash containing toxic materials, cement and water; the process comprising the steps of;
   a.) observing the temperatures of the primary and secondary ingredients,
   b.) determining the concentration of water in the wet ash,
   c.) measuring an amount of primary ingredient,
   d.) providing a calculation step and conveying the amount, the ingredient temperatures and the concentration of water in the wet ash to the calculation step,
   e.) establishing product condition limits and conveying these limits to the calculation step,
   f.) calculating, by way of an iterative heat balance, the quantities of the secondary ingredients required to be mixed with the measured amount of the primary ingredient, to establish product conditions after the mixing step that will be within the desired product condition limits,
   g.) conveying the calculated quantities of the secondary ingredients plus the measured amount of the primary ingredient to a mixer/tumbler,
   h.) mixing/tumbling all the ingredients thereby securing a product having a temperature and a moisture content.

6. A process as recited in claim 5 where the hot earth entering the process has a temperature greater than 212 F.

7. A process as recited in claim 6 further providing that the product condition limits after the mixing step are 175 F.+/−25 F. temperature and a water content equal to 28 percent of the mass of cement and that these limits are conveyed to the calculation step.

8. A process as recited in claim 7, further providing for observing the temperature and moisture content of the product, transmitting the observed product conditions into the calculation step, comparing the observed product conditions with the product condition limits and, if the observed product conditions are outside the product condition limits, calculating and adjusting the quantity of one or more secondary ingredients to bring the condition of successive products within said limits.

9. A process for fixing and stabilizing toxic metal and organic contamination contained in trash-burner ash within a concrete-like aggregate product, the process employing hot earth as primary ingredient, said hot earth being the output of a pyrolytic earth purifier; and secondary ingredients comprising wet ash produced by a trash burner, said ash containing toxic materials; cement and water; the process comprising the steps of;

a.) observing the temperatures of the primary and secondary ingredients, b.) determining the concentration of water in the wet ash, c.) measuring an amount of primary ingredient, d.) providing a calculation step and conveying the amount, the ingredient temperatures and the concentration of water in the wet ash to the calculation step, e.) establishing product condition limits and conveying these limits to the calculation step, f.) calculating, by way of an iterative heat balance, the quantities of the secondary ingredients required to be mixed with the measured amount of the primary ingredient, to establish product conditions after the mixing step that will be within the desired product condition limits, g.) conveying the calculated quantities of the secondary ingredients plus the measured amount of the primary ingredient to a mixer/tumbler, h.) mixing/tumbling all the ingredients thereby securing a product having a temperature and a moisture content.

10. A process as recited in claim 9 where the hot earth is the sole external heat source.

11. A process as recited in claim 10 where the hot earth entering the process has a temperature greater than 212 F.

12. A process as recited in claim 1 further providing that the product condition limits after the mixing step are 175 F.+/−25 F. temperature and a water content equal to 28 percent of the mass of cement and that these limits are conveyed to the calcuation step.

* * * * *